United States Patent

Bergman et al.

Patent Number: 5,459,286
Date of Patent: Oct. 17, 1995

[54] ELECTRIC CONDUCTOR WITH INSULATION

[75] Inventors: Jan Bergman, Spånga; Lennart Johansson, Västerås, both of Sweden

[73] Assignee: Asea Brown Boveri AB, Västerås, Sweden

[21] Appl. No.: 244,325
[22] PCT Filed: Sep. 20, 1993
[86] PCT No.: PCT/SE93/00758
§ 371 Date: Jul. 7, 1994
§ 102(e) Date: Jul. 7, 1994
[87] PCT Pub. No.: WO94/07249
PCT Pub. Date: Mar. 31, 1994

[30] Foreign Application Priority Data

Sep. 22, 1992 [SE] Sweden ................. 9202736

[51] Int. Cl.$^6$ ......................... H01B 7/00
[52] U.S. Cl. ................ 174/120 R; 174/110 PM
[58] Field of Search .......... 174/120 R, 120 SR, 174/110 PM; 548/420

[56] References Cited

U.S. PATENT DOCUMENTS

| | | | |
|---|---|---|---|
| 3,629,110 | 12/1971 | Hunt | 252/63.2 |
| 4,689,362 | 8/1987 | Dexter | 174/110 PM |
| 4,724,248 | 2/1988 | Dexter et al. | 524/262 |
| 5,162,609 | 11/1992 | Adriaenssens et al. | 174/34 |
| 5,185,360 | 2/1993 | Sainsbury et al. | 514/410 |
| 5,270,486 | 12/1993 | Chan et al. | 174/23 R |
| 5,378,856 | 1/1995 | Allen | 174/120 R |

*Primary Examiner*—Morris H. Nimmo
*Attorney, Agent, or Firm*—Watson, Cole, Grindle & Watson

[57] ABSTRACT

An electric conductor (10, 20, 30) provided with an insulating layer (11, 21, 31) and a protective layer (12, 22, 32), surrounding the conductor, in the form of a polymer material containing at least :stabilized polyethylene. To said polyethylene there is added a combined antioxidant and voltage stabilizer, in the form of 5,10-dihydroindeno[1,2-b]indole or substituted florins thereof such as methyl, methoxy, dimethylamino or other donor substituents to counteract degradation as a result of electric load.

7 Claims, 1 Drawing Sheet

ELECTRIC CONDUCTOR WITH INSULATION

TECHNICAL FIELD

The invention relates to an electric conductor with a surrounding insulation in the form of a polymer material. More particularly, the invention relates to an electric conductor with a surrounding insulation containing polyethylene with addition of a combined antioxidant and voltage stabilizer to better resist the degrading effects to which a polymer material is subjected as a result of electric load or by the influence from other external fields of force.

BACKGROUND ART

Polymeric materials are influenced by electric: fields, which results in chemical changes such as crosslinking, chain-scission, the occurrence of double-bond formations, gas evolution and oxidation. To resist these degradation mechanisms, polymers are stabilized by additives. Electric insulating material is stabilized preferably by voltage stabilizers and antioxidants.

Voltage stabilizers, also known as "energy scavengers", protect the polymers against degradation by capturing electrons which function as carriers of energy in the electric field acting on the polymer. To prevent degradation of such an electrically insulating material for cables on the basis of polyethylene, it is known, for example from U.S. Pat. No. 3,629,110, to add voltage stabilizers in the form of aromatic hydrocarbon compounds such as phthalic acid anhydride, benzoguanamine, triphenyl formazan, quinoline, isoquinoline, indene, indole and quinaldine in contents of between 0.1 and 10 per cent by weight. According to this specification, the voltage stabilizer is also supplemented with an antioxidant, sterically inhibited thiophenol. Certain of the compounds such as quinoline and isoquinoline, which exhibit the greatest effect on preventing degradation of polyethylene as a result of electric load, also exhibit an undesired toxicity.

Oxidation in electric insulating materials is initiated and propagate preferably by means of radicals which are formed under the influence of electric fields. This degradation of the polymer is counteracted by the addition of an antioxidant, a radical scavenger, which reacts with the radicals and interrupts the degrading chain reactions. From EP-B 404 536, an antioxidant in the form of 5,10-dihydroindeno[1.2-b] indole, and substituted forms thereof, is known. The antioxidant is preferably intended to be included in medical preparations intended for treatment of diseases in which the biological tissue is broken down as a result of the influence of radicals. In addition, it is indicated that 5,10-dihydroindeno[1,2-b] indole can be used for checking and preventing degradation which is initiated and propagates by means of radicals in products such as skin care products and foodstuffs.

It is an object of the invention to provide an electric conductor which is provided with an electrically insulating layer in the form of a polyethylene, to which a combined antioxidant and voltage stabilizer has been added. It is a further object of the invention that this combined antioxidant and voltage stabilizer shall have a small toxicity to minimize the health hazards and the environmental influence when compounding the polyethylene, when manufacturing cable, and when taking care of cable scrap.

SUMMARY OF THE INVENTION

The invention relates to an electric conductor surrounded by at least one electrically insulating layer and/or at least one protective layer in the form of polymeric materials, these layers being arranged around the conductor. At least one of the layers contains a stabilized polyethylene with additives to counteract degradation as a result of electric load or influence from other external fields of force. According to the invention, degradation of the polyethylene, caused by electric load or by the influence from other external fields of force, is counteracted by providing the stabilized polyethylene with a combined antioxidant and voltage stabilizer in the form of 5,10-dihydroindeno[1,2-b] indole or substituted forms thereof such as methyl, methoxy, dimethylamino or other donor substituents. In the following, reference is made only to the mentioned group with a combined function as both antioxidant and voltage stabilizer only as 5,10-dihydroindeno[1,2-b]indole.

According to the invention, the polyethylene contains 5,10-dihydroindeno[1,2-b]indole in contents of up to 5 per cent by weight. A particularly favourable effect of 5,10-dihydroindeno[1.2-b]indole is obtained according to an embodiment of the invention when contents of between 0.05 and 2 per cent by weight are used.

5,10-dihydroindeno[1,2-b]indole, a substance the manufacture of which is known, counteracts degradation by electrically loaded material by serving both as antioxidant and voltage stabilizer by capturing electrons and radicals.

In a preferred embodiment of the invention, the conductor is arranged in the form of a cable which comprises a core of one or more metallic conductors surrounded by a cable insulation. This cable insulation comprises at least one electrically insulating layer, arranged around the metallic conductor mentioned, in the form of an unfilled thermoplastic or crosslinkable polyethylene stabilized according to the invention.

In an embodiment of the cable mentioned, the cable insulation comprises at least one protective layer arranged around the core of metallic conductors and the existing electrically insulating layers. The protective layer comprises a filled thermoplastic or crosslinkable polyethylene stabilized according to the invention.

In a further embodiment of the above-mentioned cable, the cable insulation comprises an inner filling arranged inside the above-mentioned insulating layer. This inner filling consists of a polymer which is soft when being applied and has good adhesion to the metallic conductor(s) for longitudinal water sealing, which comprises at least one thermoplastic or crosslinkable polyethylene stabilized according to the invention.

BRIEF DESCRIPTION OF THE DRAWING—EXAMPLES

The invention will be described in greater detail in the following with reference to the examples and the accompanying drawing.

FIG. 1 shows a test plate with electrodes according to the tests described in the following, and FIGS. 2 to 4 show electric conductors with a surrounding insulation according to the invention.

EXAMPLES

Starting from a crosslinkable low-density polyethylene, LDPE, free from peroxides and other additives and intended for cable insulation, NCPE 4201 from NESTE Chemicals, two series of test plates were formed.

Series A consisted of the pure polyethylene which was extruded into bars which were rolled before being compression-moulded into plates.

In series B, 0.98 per cent by weight 5,10-dihydroindeno [1,2-b] indole was added to the pure polyethylene before the latter was extruded, rolled and compression-moulded in accordance with the plates in series A.

Test plates with a size of 25×25×6 mm were then sawn out of the compression-moulded plates of both series. The test plates were heated to a temperature of 115°–120° C. whereby electrodes in the form of two needles were introduced into the plates according to FIG. 1. The pointed electrode 1 had a radius at the tip of 5±2 μm and the blunt electrode 2 had a radius at the tip of 500 μm. The needles were introduced into the plate 3 until a gap of 3,5±0.3 mm remained between the tips of the electrodes 1, 2. The test plates were then conditioned in a laboratory exsiccator for 7 days at a relative humidity of 50%.

After the conditioning, the test plates were transferred to test chambers/holders with the same atmosphere as in the exsiccator, whereby the electrodes were electrically connected to the test equipment.

During testing, a power frequency voltage was applied across the electrode gap. The testing was started with an applied voltage of 8 kV which was increased linearly by 0.1 k V/min up to 22 kV. The partial discharge (PD) impulses were registered, collected and evaluated, whereupon, inter alia, the electrical treeing inception voltage, U.0.1, of the individual test plates was determined. The index 01 refers to the fact that the applied voltage was increased by 0.1 kV/min.

For the test plates in series A, the electrical treeing inception voltage was 14.4 kV with a variation within a 90% confidence interval of 13.9 to 14.9 kV whereas the corresponding voltage for the test plates in series B exceeded the maximum applied voltage, 22 kV.

DESCRIPTION OF THE PREFERRED EMBODIMENTS

Figure 1:
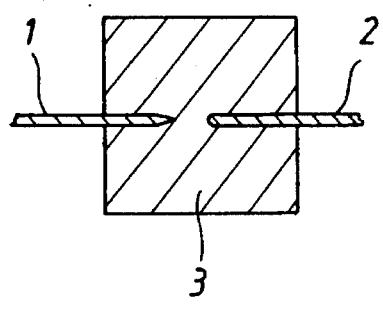

Test plates 3 in the tests; described above, which had a size of 25×25×6 mm, were sawn out of the compression-moulded plates from both series. The test plates 3 were heated to a temperature of 115°–120° C., whereupon electrodes 1, 2 in the form of two needles were introduced into the plates according to FIG. 1. The pointed electrode 1 had a radius at its tip of 5±2 μm whereas the blunt electrode 2 had a radius at its tip of 500 μm. The needles were introduced into the plate 3 until a gap of 3.5±0.3 μm remained between the tips of the electrodes 1, 2. The test plates 3 with inserted electrodes 1, 2 were conditioned in a laboratory exsiccator for 7 days at a relative humidity of 50%. After the conditioning, the test plates 3 with the inserted electrodes 1, 2 were transferred to test chambers/holders with the same atmosphere as in the exsiccator, whereupon the electrodes were electrically connected to the test equipment. During testing, a voltage at power frequency was applied across the gap between the tips of the electrodes 1, 2. The testing was started with an applied voltage of 8 kV which was linearly increased by 0.01 kV/min up to 22 kV. The partial discharge impulses were registered, collected and evaluated, whereupon the electrical treeing inception voltage U.01. of the individual test plates was determined. The index 01 refers to the fact that the applied voltage was increased by 0.01 kV/min.

Figure 2:
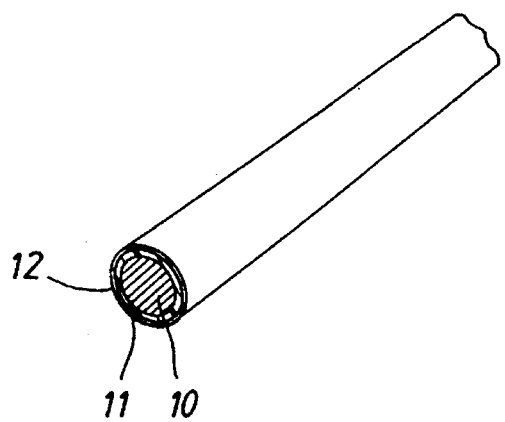

FIG. 2 shows an electric conductor 10 in the form of a round wire, surrounded by an electrically insulating layer 11 and a protective layer 12.

Figure 3:
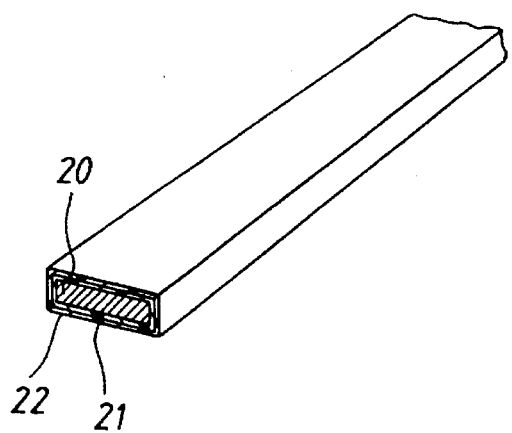

FIG. 3 shows an electric conductor 20 in the form of a square wire, surrounded by an electrically insulating layer 21 and a protective layer 22.

Figure 4:
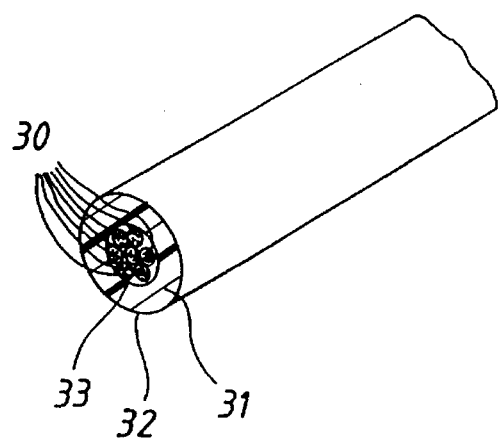

FIG. 4 shows an electric cable with a core of one or more metallic conductors 30 surrounded by a cable insulation. The cable insulation comprises an electrically insulating layer 31, arranged around the mentioned metallic conductors 30 and comprising an unfilled thermoplastic or crosslinkable polyethylene, to which 5,10-dihydroindeno [1,2-b]indole has been added. Around the insulating layer 31 there is arranged a protective layer 32, comprising a filled thermoplastic or crosslinkable polyethylene, to which 5,10-dihydroindeno[1,2-b] indole has been added. Inside this insulating layer 31 an inner filling 33 is arranged, comprising a thermoplastic or crosslinkable polyethylene, to which 5,10-dihydroindeno[1,2-b] indole has been added. This inner filling 33 has a good adhesion to the metallic conductors 30, whereby longitudinal water sealing is obtained.

The cable in FIG. 4 comprises a polyethylene to which, according to the invention, 5,10-dihydroindeno[1,2-b]indole has been added in all layers, that is, the inner filling, the insulating layer and the protective layer. It is, of course, not necessary that all the layers 31, 32, 33 in a cable insulation according to the invention comprise a polyethylene to which 5,10-dihydroindeno[1,2-b]indole has been added. In one or more of the layers included in a cable insulation, the polyethylene mentioned can be replaced by a suitable material as long as any of the layers 31, 32, 33 included in the cable insulation comprises a polyethylene according to the invention without departing from the inventive concept.

We claim:

1. An electric conductor provided with at least one electrically insulating layer (11, 21, 31) and/or at least one protective layer (12, 22, 32) in the form of polymer material, said layers surrounding the conductor (10, 20, 30), wherein at least one of the layers contains a stabilized polyethylene with additives to counteract degradation as a result of electric load, characterized in that to said stabilized polyethylene there is added a combined antioxidant and voltage stabilizer in the form of 5,10-dihydroindeno[ 1,2-b]indole or substituted forms thereof such as methyl, methoxy, dimethylamino or other donor substituents.

2. An electric conductor according to claim 1, characterized in that 5,10-dihydroindeno [1,2-b]indole, in contents of up to 5 per cent by weight, is added to the polyethylene.

3. An electric conductor according to claim 2, characterized in that 5,10-dihydroindeno[1,2-b]indole, in contents of up to 0.05 to 2.0 per cent by weight, is added to the polyethylene.

4. An electric conductor according to claim 1, characterized in that the electric conductor (30) is arranged in the form of one or more metallic conductors surrounded by a cable insulation which comprises at least one electrically insulating layer (31), arranged around said metallic conductor(s), in the form of an unfilled thermoplastic or crosslinkable polyethylene to which 5,10-dihydroindeno[ 1,2-b]indole has been added.

5. An electric conductor according to claim 1, characterized in that the electric conductor (30) is arranged in the form of one or more metallic conductors surrounded by a cable insulation which comprises at least one protective layer (32), arranged around said metallic conductor(s) and the existing electrically insulating layer (31), in the form of a filled thermoplastic or crosslinkable polyethylene to which 5,10-dihydroindeno[1,2-b]indole has been added.

6. An electric conductor according to claim 5, characterized in that said cable insulation comprises an inner filling (33), arranged inside said insulating layer (31), with good adhesion to said metallic conductor(s) for longitudinal water sealing, in the form of a thermoplastic or crosslinkable polyethylene to which 5,10-dihydroindeno[1,2-b]indole has been added.

7. An electric conductor according to claim 5, wherein said cable insulation comprises an inner filling (33), arranged inside said insulating layer (31), with good adhesion to said metallic conductor(s) for longitudinal water sealing, in the form of a thermoplastic or crosslinkable polyethylene to which 5,10-dihydroindeno[1,2-b]indole has been added.

* * * * *